US009760239B2

(12) United States Patent
Roh et al.

(10) Patent No.: US 9,760,239 B2
(45) Date of Patent: *Sep. 12, 2017

(54) CONTROL DEVICE AND CONTROL METHOD THEREOF

(71) Applicant: SAMSUNG ELECTRONICS CO., LTD., Suwon-si (KR)

(72) Inventors: Yeon-hee Roh, Seoul (KR); Chang-seog Ko, Hwaseong-si (KR); Soung-min Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 74 days.

This patent is subject to a terminal disclaimer.

(21) Appl. No.: 14/643,622

(22) Filed: Mar. 10, 2015

(65) Prior Publication Data

US 2015/0185970 A1 Jul. 2, 2015

Related U.S. Application Data

(63) Continuation of application No. 12/393,700, filed on Feb. 26, 2009, now Pat. No. 9,003,324.

(30) Foreign Application Priority Data

Jun. 13, 2008 (KR) .................. 10-2008-0055647

(51) Int. Cl.
*G06F 3/0481* (2013.01)
*G06F 3/048* (2013.01)
*H04N 21/431* (2011.01)
*H04N 21/436* (2011.01)

(52) U.S. Cl.
CPC ............ *G06F 3/0481* (2013.01); *G06F 3/048* (2013.01); *H04N 21/431* (2013.01); *H04N 21/43615* (2013.01)

(58) Field of Classification Search
None
See application file for complete search history.

(56) References Cited

U.S. PATENT DOCUMENTS

| 5,060,135 A * | 10/1991 | Levine ................ G06F 3/04817 715/769 |
| 6,745,252 B1 | 6/2004 | Yanagawa et al. |
| 6,820,807 B1 | 11/2004 | Antognini et al. |

(Continued)

FOREIGN PATENT DOCUMENTS

| KR | 10-2006-0133416 A | 12/2006 |
| WO | 00-033572 A1 | 6/2000 |

OTHER PUBLICATIONS

Communication issued May 26, 2014; by the Korean Patent Office in corresponding Application No. 10-2008-0055647.
Office Action dated Apr. 19, 2011 received in parent U.S. Appl. No. 12/393,700.
Final Office Action dated Oct. 3, 2011 received in parent U.S. Appl. No. 12/393,700.
Office Action dated Feb. 2, 2012 received in parent U.S. Appl. No. 12/393,700.

(Continued)

*Primary Examiner* — Tuan S Nguyen
(74) *Attorney, Agent, or Firm* — Sughrue Mion, PLLC

(57) ABSTRACT

A control device which controls a device is disclosed. The control device can be connected to at least one external device, and includes a display unit which generates and displays a frame; and a control unit which controls the display unit to add at least one frame corresponding to each of the at least one external device or to pre-installed applications. The control unit further controls the display unit to display corresponding content in each frame.

14 Claims, 7 Drawing Sheets

(56) References Cited

U.S. PATENT DOCUMENTS

| | | | |
|---|---|---|---|
| 7,607,150 B1 * | 10/2009 | Kobayashi | G06F 3/0482 |
| | | | 348/206 |
| 2005/0235209 A1 | 10/2005 | Morita et al. | |
| 2006/0132505 A1 | 6/2006 | Shin | |
| 2007/0107019 A1 | 5/2007 | Romano et al. | |
| 2007/0160345 A1 | 7/2007 | Sakai et al. | |
| 2008/0063357 A1 | 3/2008 | Kunieda et al. | |
| 2008/0163059 A1 * | 7/2008 | Craner | H04N 5/44543 |
| | | | 715/719 |
| 2008/0276279 A1 | 11/2008 | Gossweiler et al. | |
| 2009/0064225 A1 * | 3/2009 | Lee | H04N 5/44543 |
| | | | 725/39 |
| 2009/0288131 A1 | 11/2009 | Kandekar et al. | |
| 2011/0170390 A1 | 7/2011 | Hirota | |

OTHER PUBLICATIONS

Final Office Action dated Jul. 16, 2012 received in parent U.S. Appl. No. 12/393,700.
Office Action dated Apr. 16, 2013 received in parent U.S. Appl. No. 12/393,700.
Final Office Action dated Oct. 10, 2013 received in parent U.S. Appl. No. 12/393,700.
Office Action dated Feb. 13, 2014 received in parent U.S. Appl. No. 12/393,700.
Final Office Action dated Aug. 6, 2014 received in parent U.S. Appl. No. 12/393,700.
Notice of Allowance dated Dec. 3, 2014 received in parent U.S. Appl. No. 12/393,700.

* cited by examiner

CONTROL DEVICE AND CONTROL METHOD THEREOF

CROSS-REFERENCE TO RELATED APPLICATIONS

This application is a continuation application of U.S. application Ser. No. 12/393,700 filed Feb. 26, 2009, which claims priority from Korean Patent Application No. 10-2008-0055647, filed on Jun. 13, 2008 in the Korean Intellectual Property Office, the disclosures of which are incorporated herein by reference in their entirety.

BACKGROUND OF THE INVENTION

1. Field of the Invention

Apparatuses and methods consistent with the present invention relate to providing a control device and a control method thereof, and more particularly, to providing a control device which controls at least one device, and a control method thereof.

2. Description of the Related Art

With the recent development of image and voice media, the types of devices which can be connected to a home network have gradually diversified and the functions of each device have become more complicated.

One such device may control other connected devices. Hereinafter, such a device is referred to as a control device.

A related art control device provides a user with a control menu for controlling other connected devices. At this time, the provided control menu displays a list of the connected devices, and the user enters a control mode by selecting a device from the list.

Accordingly, the user may check the content and functions of each device, after entering the control mode by selecting the device. When a specific device does not contain the searched-for content, the user must inconveniently search for the content again after entering the control mode of a new device.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide a control device which generates frames corresponding to connected devices or corresponding to pre-installed applications and displays the corresponding content on the generated frames to control external devices easily, and a control method thereof.

According to an aspect of the present invention, there is provided a control device, which can be connected to at least one external device, the control device comprising a display unit which generates and displays frames, and a control unit which controls the display unit to add frames corresponding to each of the external devices or pre-installed applications and to display the corresponding content in each frame.

The control unit may control the display unit to reduce a size of the current frame and add frames corresponding to each of the external devices or the pre-installed applications to one side of the reduced frame.

The control unit may control the display unit to reproduce within a corresponding frame either a content or a content list for a device or applications corresponding to the frame.

The control unit may control the display unit to arrange and display the frames and frames to be added in a row.

The control unit may control navigation of the arranged frames according to user selection.

The control unit may control the display unit to display the arranged frames in a three-dimensional array by overlapping a plurality of two-dimensional frames, and arranging the overlapping two-dimensional frames in a sequence of the content recently accessed by the corresponding device and application.

The control unit may control the navigation of the arranged frames up and down or right and left.

The control unit may enlarge and display the selected frame on the entire screen, if any one of the arranged frames is selected.

The control unit may control the operation of the device or the application corresponding to the selected frame.

The control device may further comprise an input unit which receives a user command, wherein at least one of a number of frames, a deletion of a frame, an addition of a frame, a size of a frame, and an order of the frames is set through the input unit.

According to another aspect of the present invention, there is provided a control method of a control device, which can be connected to at least one external device, the control method comprising (a) generating and displaying frames corresponding to an application, (b) displaying additional frames corresponding to each of the at least one external devices and the pre-installed applications according to the content included in the external devices, and (c) displaying the content corresponding to a device or application in each frame.

The operation (b) may comprise reducing a size of frames corresponding to the applications, and adding and displaying frames corresponding to each of the external devices or the pre-installed applications to one side of the reduced frame.

The control method may further comprise arranging and displaying the frames in a row.

Navigation of the arranged frames may be controlled according to user input.

The arranged frames may be displayed in a three-dimensional array by overlapping a plurality of two-dimensional frames, and the overlapping two-dimensional frames may be arranged in the sequence of the contents recently accessed by the corresponding device and application.

Navigation of the arranged frames may be controlled up and down or right and left.

The control method may further comprise, if any one of the arranged frames is selected, enlarging and displaying the selected frame to cover an entire screen.

The control method may further comprise controlling the operation of the device or the application corresponding to the selected frame.

According to another aspect of the present invention, there is provided a computer recording medium including an execution program for executing a control method of a control device, which can be connected to at least one external device.

BRIEF DESCRIPTION OF THE DRAWINGS

The above and/or other aspects of the present invention will be more apparent from the following detailed description of certain exemplary embodiments of the present invention with reference to the accompanying drawings, in which.

DETAILED DESCRIPTION OF EXEMPLARY EMBODIMENTS

Figure 1:
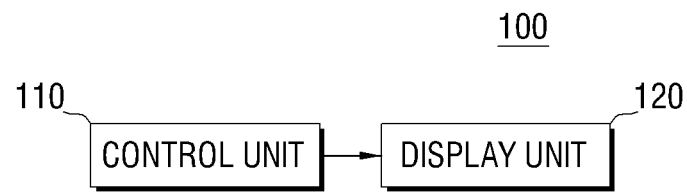
FIG. 1 is a block diagram showing a configuration of a control device according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as the detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram showing a configuration of a control device according to an exemplary embodiment of the present invention. Referring to FIG. 1, a control device 100 includes a control unit 110 and a display unit 120. Here, the control device 100 is connected to at least one external device (not shown), thereby enabling the control device 100 to provide a user interface (UI) for controlling operations of external devices.

Devices may include a digital television (TV), a digital versatile disk (DVD) player, a Moving Picture Experts Group Layer-3 Audio (MP3) player, a portable media player (PMP), a cellular phone, a camcorder, a digital camera, a storage medium, a personal computer (PC), or the like, and may be connected to each other through a network or the like. In such a home network environment, any device which has a display function may be a control device 100. In the exemplary embodiment of the present invention, the control device 100 is a digital television (DTV), as an example.

The control unit 110 may control the entire operation of the control device 100, the network connection with external devices, and the external devices connected to the network. In other words, the control unit 110 may control a plurality of devices connected thereto and receive information from the respective devices by performing two-way communication with each device within the home network.

The display unit 120 generates and displays frames under the control of the control unit 110.

The control unit 110 controls the display unit 120 to add frames corresponding to the external device or each of the pre-installed applications, if a user command for controlling the external device is received. When content corresponding to the pre-installed applications is included in the external devices, a frame corresponding to the relevant application may be generated. The control unit 110 does not generate a frame if the pre-installed application does not have the relevant content.

When the control unit 110 does not have any external devices connected thereto and receives the user command for controlling the control device 100, the control unit 100 may control functions of the control device 100 by providing frames corresponding to the pre-installed applications according to the content within the control device 100. Even in this case, the control unit 110 does not generate a frame if the pre-installed application does not have the relevant content.

Here, the applications may be programs that classify the content provided by the external devices and the control device 100 according to a user's preferences. When the user classifies the content as moving pictures, widgets, music files, photographs, and the like, the display unit 120 generates frames for each type of content depending on whether the content is present.

More specifically, when the control device 100 receives broadcast programs and stores moving pictures, if a control command for the control device 100 is input, the control unit 110 controls the display unit 120 to reduce the current frame in which the broadcast programs or moving pictures are reproduced, and generate and display frames for the broadcast programs and the moving pictures.

If a control command for the external devices is received, the control unit 110 may reduce the current frame, and generate frames corresponding to each of the plurality of external devices and frames corresponding to the applications classifying the content provided by the devices according to specific functions to display them on one side of the current frame.

Figure 2:
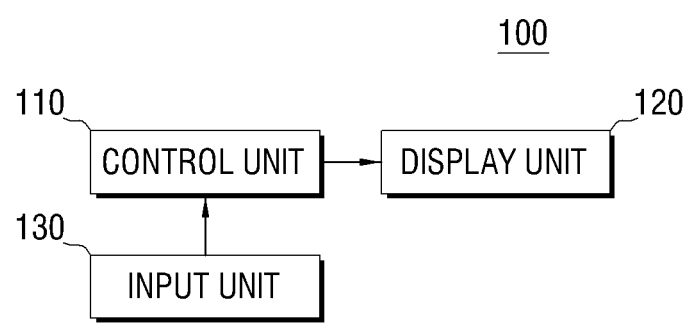
FIG. 2 is a block diagram showing a configuration of a control device according to another exemplary embodiment of the present invention.

FIG. 2 is a block diagram showing a configuration of a control device according to another exemplary embodiment of the present invention. Referring to FIG. 2, the control device of FIG. 1 further comprises an input unit 130. A control unit 110 and a display unit 120 may perform the same functions as the corresponding devices in FIG. 1.

The input unit 130 receives a user command. In the exemplary embodiment, the user command may be a control command for the control device 100 or the external devices, or a user command for setting frames.

If a control command for the external devices is received, the control unit 110 controls the display unit 120 to reduce the current frame in which the content is reproducing, and adds frames to one side of the reduced current frame so that the frames are arranged in a row.

The display unit 120 may reproduce the content provided by the corresponding device or application or display a list of content on the added frames.

In other words, when the display unit 120 is controlled by the control unit 110 to generate frames for the application classifying music files, a television, and a digital camera, the display unit 120 generates each frame. The display unit 120 may also generate and display a list of music files provided by the device connected to the home network on the frame for the application classifying music files. The display unit 120 may also output a broadcast signal in the frame for the television, and display photo files in the frame for the digital camera.

A more detailed explanation relating to the control operation of the control device will be provided with reference to FIGS. 3A to 3H and 4.

Figure 3A:
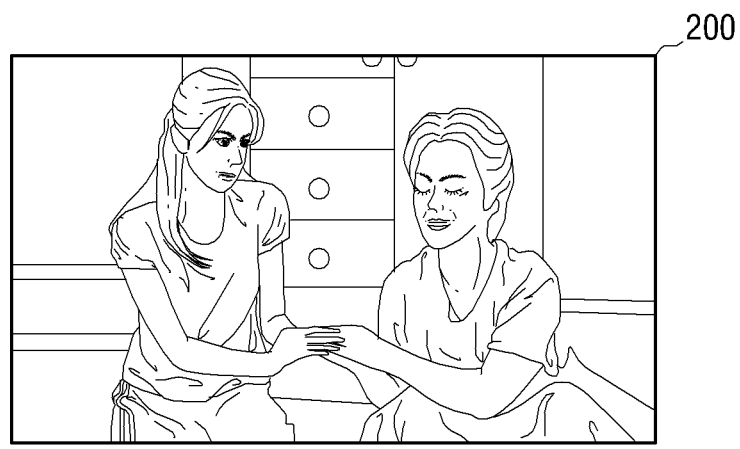
FIGS. 3A to 3H show a control method of a control device according to an exemplary embodiment of the present invention.
Figure 3B:
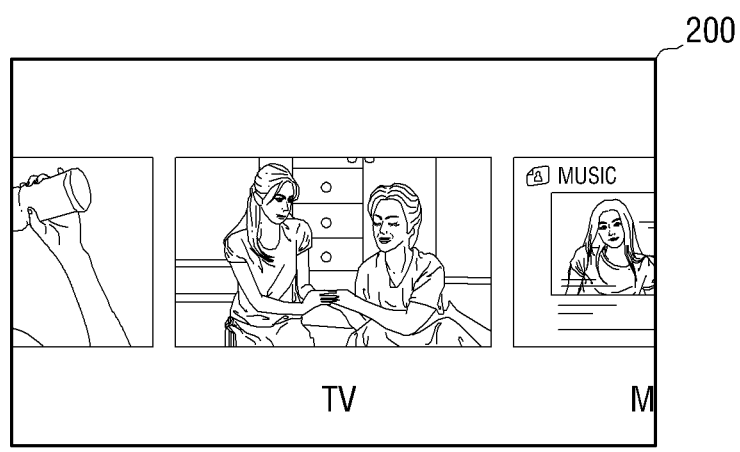

FIGS. 3A to 3H show a method for providing a user interface (UI) of a control device according to an exemplary embodiment of the present invention. Referring to FIG. 3A, a broadcast signal selected by a user is output through a screen 200. If a control command for external devices is input while the basic functions of the control device 100 are performed, the current frame covering the entire screen is reduced and displayed, as shown in FIG. 3B. Other frames are also added to sides of the current frame.

Figure 3C:
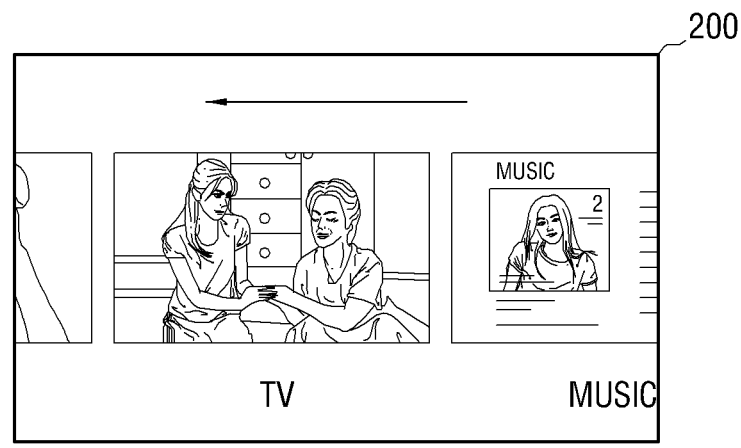

The frames displayed on the screen 200 may be arranged in a row so as to be navigated according to the control of the user. The user may navigate the frames arranged in a row by moving them leftward, as shown in FIG. 3C.

Figure 3D:
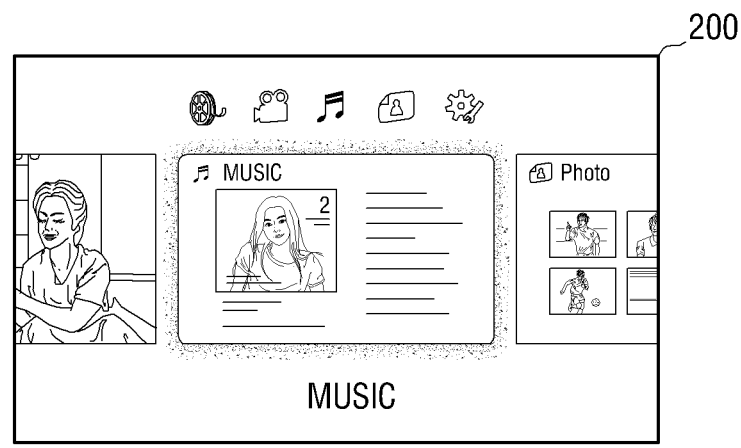
Figure 3E:
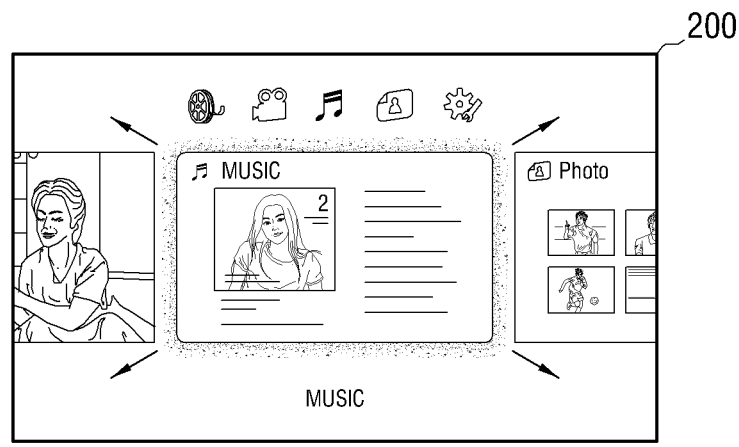
Figure 3F:
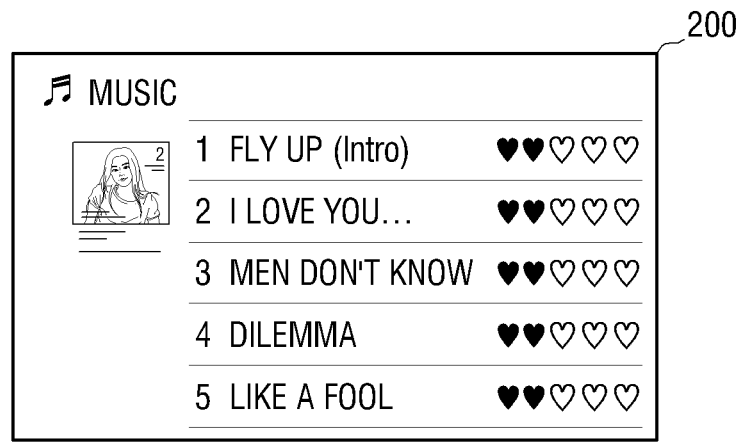
Figure 3G:
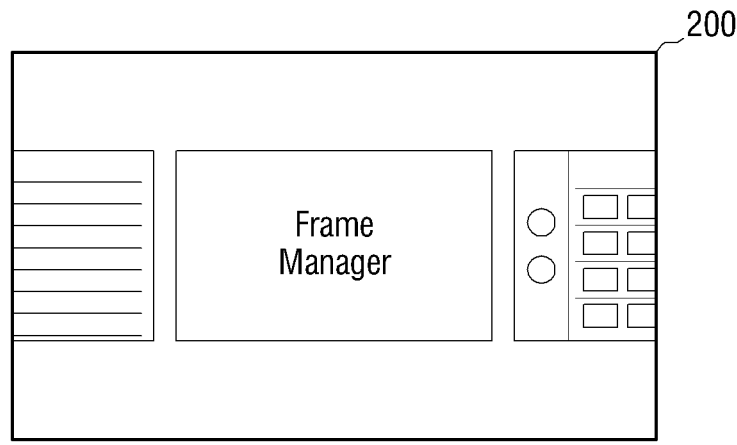

If one of the displayed frames is selected in FIG. 3D, the selected frame is enlarged to be displayed on the entire screen as shown in FIGS. 3E and 3F.

At this time, the control unit 110 may control the content classified by the device or application corresponding to the enlarged frame. In other words, when the application for music files is selected as shown in FIG. 3F, the control unit 110 may reproduce the music files on the list and check which device of the connected devices provided the music files.

The frames provided by the display unit 120 become selectable menus. Here, frame managers for managing frames may be provided in the frames provided by the display unit 120. If a frame manager is selected by a user in FIG. 3G, the frame manager is enlarged to be displayed on the entire screen, thereby entering a frame manager mode. According to FIG. 3H, the frame manager includes a button (a) to display a plurality of frames according to the control command for external devices and to set the arrangement order of the displayed frames, a frame deletion button (b), buttons (c) and (d) to adjust the size of frames, and a button (e) to set a number of frames displayed on the screen. A frame addition button, a button to set the total number of frames and the like may be further included.

Figure 3H:
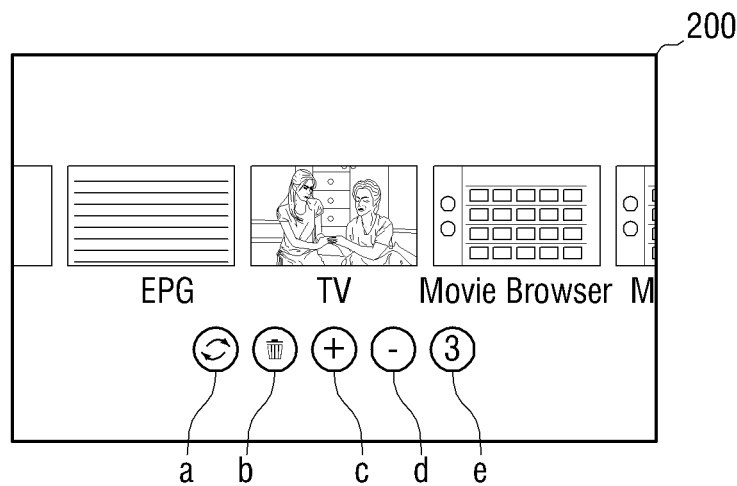

In FIG. 3H, the number of frames displayed on the screen is set to three, so three frames are displayed on one screen. If the number of frames displayed on the screen is set to two, two frames may be displayed on the frame manager. In other words, the same functions as a preview are performed.

Figure 4:
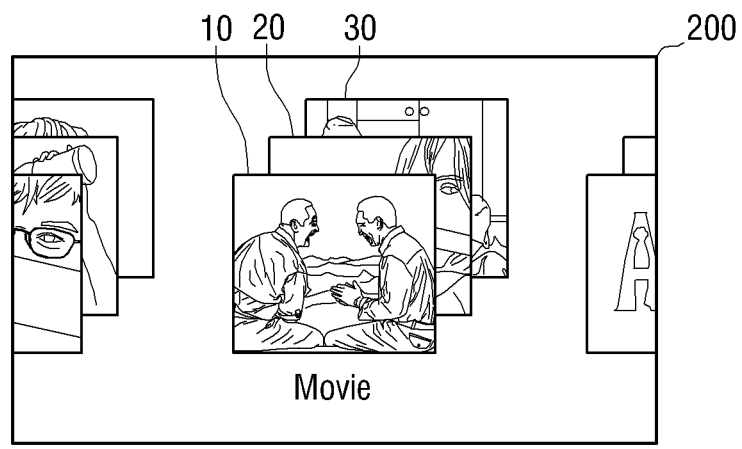
FIG. 4 shows a control method of a control device according to another exemplary embodiment of the present invention.

The exemplary embodiment of the present invention describes the case in which the frames are arranged in a row, as shown in FIGS. 3A to 3H, but the frames may be displayed in a three-dimensional array, i.e., in a superimposed or overlapping manner, as shown in FIG. 4.

FIG. 4 shows a method for providing a UI of a control device according to another exemplary embodiment of the present invention. As shown in FIG. 4, a plurality of two-dimensional frames may be displayed in a row, and partially-overlapping with each other, forming a three-dimensional array.

Here, overlapped two-dimensional frames 10, 20, 30 may be arranged in the sequence of content recently accessed by the corresponding devices or applications.

FIG. 4 shows frames for the application classified as movie, wherein movie scenes are displayed in the sequence of content recently accessed by a user. When audio signals of each image content are reproduced, the audio of the content displayed in all frames may be muted, since multiple audio signals may cause confusion to the user. The user may set frames to reproduce only the content in the outermost or front frame and display only a still image of the content in the overlapped or back frames, without reproducing all moving pictures.

Consequently, since the content controlled by the control device is displayed using the frames, the user recognizes the device information with ease and since each frame itself becomes a device entering menu, the entering method is simplified.

In FIGS. 2 to 4, frames displaying a list of content classified according to the content of the external devices connected to the control device 100 or the like are described. However, the control device 100 may provide frames according to the sort of content within the control device 100 when the control device 100 is not connected to any external devices. Thus, the content can be searched for with ease.

Figure 5:
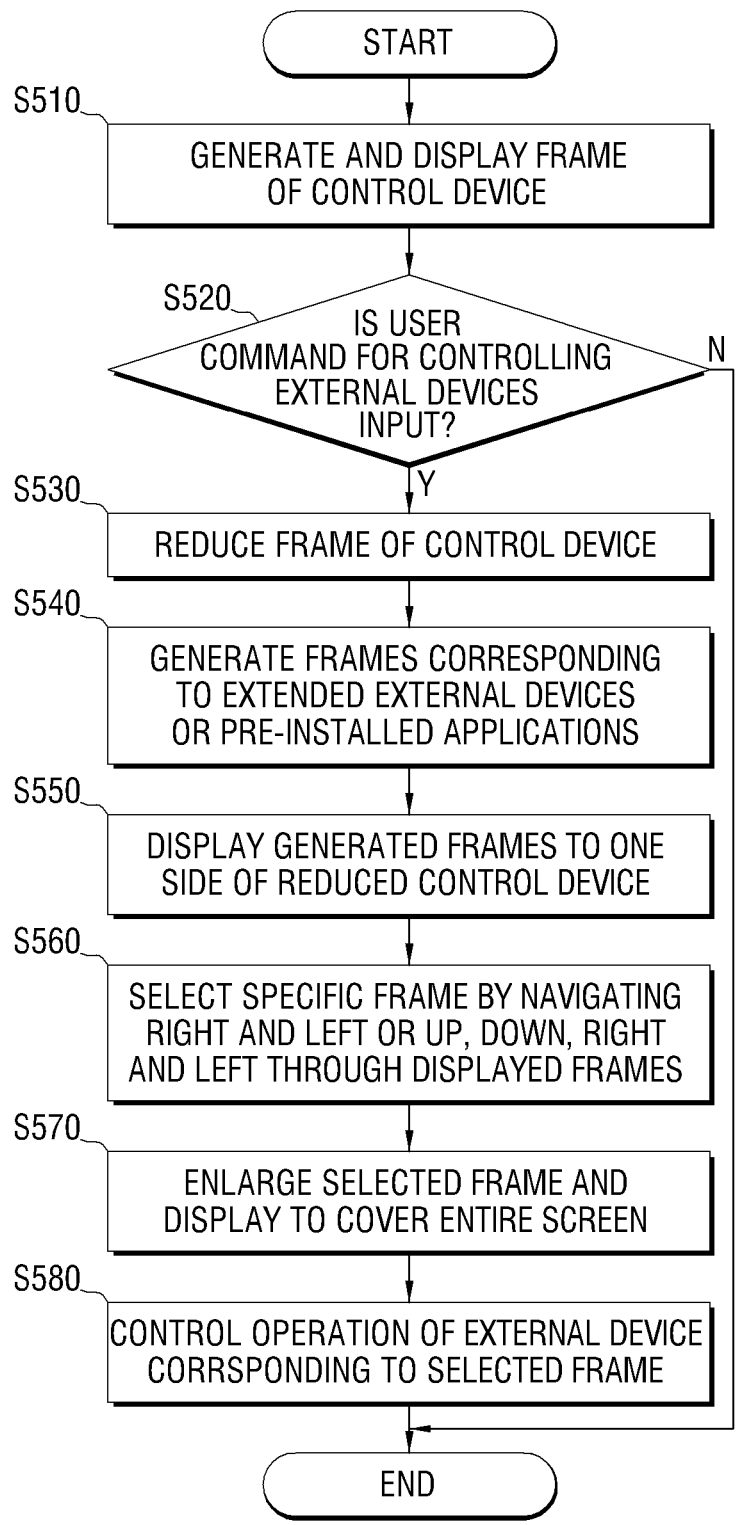
FIG. 5 is a flowchart explaining a control method of a control device according to an exemplary embodiment of the present invention.

FIG. 5 is a flowchart explaining a control method of a control device according to an exemplary embodiment of the present invention. Referring to FIG. 5, a frame of a control device 100 is generated and displayed in operation S510. At this time, the content of the control device 100 is reproduced within the frame.

Next, if it is determined that a user command for external devices is input in operation S520, the frame of the control device is reduced to a predetermined size in operation S530, and frames corresponding to connected external devices or pre-installed applications are generated and added in operation S540.

At this time, the generated frames may be displayed on one or more sides of the reduced frame of the control device 100 in operation S550. At this time, the frames are arranged in a row or a three-dimensional array to enable a user to navigate the frames with ease.

The content provided by the corresponding devices may be reproduced or a list of content may be displayed on each frame. Alternatively, the content classified by the pre-installed applications or the list of content may be displayed. Thus, the user can recognize the content of each frame with ease.

Next, a specific frame may be selected by navigating right and left, or up, down, right and left between the frames according to the user input in operation S560. If a specific frame is selected, the selected frame is enlarged to cover the entire screen and is displayed in operation S570, and thus the device or application of the corresponding frame enters a control mode. The operation of the device corresponding to the selected frame may thus be controlled.

According to an exemplary embodiment of the present invention, a computer recording medium may include at least one execution program for performing a control method of a control device 100 which can be connected to at least one external device.

Each block of the present invention may be implemented as a computer recordable code on a computer readable medium. The computer readable medium may be a device which can store data which is readable by a computer system.

For example, the computer readable medium may be a read-only memory (ROM), random-access memory (RAM), a compact disk-ROM (CD-ROM), a magnetic tape, a floppy disk, an optical disk, an optical data storage device, an image display device including the storage device such as a television, or the like.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A control device, which is connectable to at least one external device, the control device comprising:
   a display; and
   a processor configured to control the display to display a first screen and to display, in response to receiving a user input for controlling the external device, a second screen comprising the first screen reduced to a predetermined size and at least two other screens in a same layer,
   wherein each of the at least two other screens comprises a content of an application that most recently executed in the external device.

2. The control device as claimed in claim 1, wherein the at least two other screens comprise a screen corresponding to a first external device connected to the control device and a screen corresponding to a second external device connected to the control device.

3. The control device as claimed in claim 2, wherein the processor is configured to display broadcast programs currently received by the control device or display at least two other screens which reproduce contents provided from the first and second external devices connected to the control device.

4. The control device as claimed in claim 1, wherein the processor is configured to display at least one of an icon corresponding to a type of contents or a guide text on the second screen and around the at least two other screens.

5. The control device as claimed in claim 1, wherein, if one screen is selected from the second screen and the at least two other screens, the processor enlarges and displays the selected screen to cover an entire screen.

6. A control method of a control device connectable to at least one external device, the control method comprising:
   (a) displaying a first screen;
   (b) receiving a user input for controlling the external device; and
   (c) displaying, in response to receiving the user input, a second screen comprising the first screen reduced to a predetermined size and at least two other screens in a same layer, and
   wherein each of the at least two other screens comprises a content of an application that most recently executed in the external device.

7. The control method as claimed in claim 6, wherein the at least two other screens comprise a screen corresponding to a first external device connected to the control device and a screen corresponding to a second external device connected to the control device.

8. The control method as claimed in claim 7, wherein the step (c) comprises displaying broadcast programs currently received by the control device or displaying at least two other screens which reproduce contents provided from the first and second external devices connected to the control device.

9. The control method as claimed in claim 6, wherein the step (c) comprises displaying at least one of an icon corresponding to a type of contents or a guide text on the second screen and around the at least two other screens.

10. The control method as claimed in claim 6, wherein the step (c) comprises, if one screen is selected from the second screen and the at least two other screens, enlarging and displaying the selected screen to cover an entire screen.

11. The control device as claimed in claim 1, the processor is configured to reproduce a content in a screen positioned in an outermost among the second screen and the at least two other screens and display only a still image of each of contents in other screens among the second screen and the at least two other screens.

12. The control device as claimed in claim 1, wherein the at least two other screens comprise screens corresponding to contents which are classified according to a type of content by applications installed in the control device.

13. The control method as claimed in claim 6, the displaying the second screen and the at least two other screens comprises reproducing a content in a screen positioned in an outermost among the second screen and the at least two other screens and displaying only a still image of each of contents in other screens among the second screen and the at least two other screens.

14. The control method as claimed in claim 6, wherein the at least two other screens comprise screens corresponding to contents which are classified according to a type of content by applications installed in the control device.

* * * * *